United States Patent
Hu et al.

(10) Patent No.: US 12,467,964 B1
(45) Date of Patent: Nov. 11, 2025

(54) UNIVERSAL CHANNEL DEVICE AND CONTROL METHOD FOR ELECTROMAGNETIC INSTRUMENT

(71) Applicant: China University of Geosciences, Wuhan, Hubei (CN)

(72) Inventors: Xiangyun Hu, Hubei (CN); Lichao Liu, Hubei (CN); Hongzhu Cai, Hubei (CN); Wang Luo, Hubei (CN); Ri Wang, Hubei (CN); Yangyang Han, Hubei (CN); Jiahao Zhao, Hubei (CN)

(73) Assignee: China University of Geosciences, Wuhan, Hubei (CN)

( * ) Notice: Subject to any disclaimer, the term of this patent is extended or adjusted under 35 U.S.C. 154(b) by 0 days.

(21) Appl. No.: 19/200,605

(22) Filed: May 6, 2025

(30) Foreign Application Priority Data

May 7, 2024  (CN) .......................... 202410555983.9

(51) Int. Cl.
  *G01R 29/12* (2006.01)
(52) U.S. Cl.
  CPC .................................... *G01R 29/12* (2013.01)
(58) Field of Classification Search
  CPC ...................................................... G01R 29/12
  USPC ........................................................ 324/457
  See application file for complete search history.

(56) References Cited

U.S. PATENT DOCUMENTS

| | | | |
|---|---|---|---|
| 9,880,217 B1* | 1/2018 | Volkening | G01R 15/142 |
| 2010/0171434 A1* | 7/2010 | Breuer | H05B 41/2928 |
| | | | 315/224 |
| 2010/0263729 A1* | 10/2010 | Khonkar | E03B 7/071 |
| | | | 137/1 |
| 2015/0219704 A1* | 8/2015 | Ohmae | G01R 29/08 |
| | | | 702/67 |
| 2015/0316591 A1* | 11/2015 | Tsujimoto | G01R 33/096 |
| | | | 324/249 |
| 2020/0049759 A1* | 2/2020 | Schleser | G01R 35/00 |
| 2020/0304048 A1* | 9/2020 | Bigi | H02P 21/0021 |
| 2022/0410749 A1* | 12/2022 | Emami | H02J 3/322 |

* cited by examiner

*Primary Examiner* — Christopher P Mcandrew
(74) *Attorney, Agent, or Firm* — JCIPRNET

(57) ABSTRACT

Disclosed are a universal channel device and control method for electromagnetic instruments, and the device including: a measurement channel, a single electrode connector, a multi-electrode connector, a magnetic field connector and a double pole double throw switch. Two middle ports of each double pole double throw switch are connected to a measurement channel. Two ports on an outer side are connected to the positive and negative input terminals of two single electrode connectors or magnetic field connectors, two ports on another outer side are connected to the multi-electrode connectors. The measurement channel corresponding to the magnetic field connector is utilized for measuring magnetic field signals or for measuring electric field signals through the double pole double throw switch. The measurement channel corresponding to every two single electrode connectors is provided to measure electric field signals or is provided to measure electric field signals through the double pole double throw switch.

7 Claims, 3 Drawing Sheets

UNIVERSAL CHANNEL DEVICE AND CONTROL METHOD FOR ELECTROMAGNETIC INSTRUMENT

CROSS-REFERENCE TO RELATED APPLICATION

This application claims the priority benefit of China application serial no. 202410555983.9, filed on May 7, 2024. The entirety of the above-mentioned patent application is hereby incorporated by reference herein and made a part of this specification.

BACKGROUND

Technical Field

The present disclosure belongs to the field of electromagnetic instruments, and more specifically, relates to a universal channel device and a control method for electromagnetic instruments.

Description of Related Art

Resistivity is a physical quantity that describes the electrical conductivity properties of materials. Factors affecting surface resistivity include mineral composition, water content, and temperature, among others. The electrical conductivity of minerals varies significantly; for instance, metallic minerals exhibit lower resistivity, whereas non-metallic minerals demonstrate higher resistivity. The same mineral will display lower resistivity when its water content is higher compared to when its water content is lower. Therefore, by measuring surface resistivity, it is possible to analyze subsurface mineral composition and groundwater content, thereby addressing geological issues such as mineral exploration and groundwater investigation.

The electromagnetic method is a non-intrusive surface resistivity observation technique. Based on Faraday's law of electromagnetic induction, the electromagnetic method utilizes electromagnetic fields (primary fields) generated by natural or artificial sources to excite underground conductors, thereby inducing electrical currents. The electrical currents subsequently generate induced electromagnetic fields (secondary fields) within geological bodies. Geological bodies with good conductivity produce stronger secondary fields, whereas those with low conductivity produce weaker secondary fields. Electric and magnetic field sensors are deployed at the surface to receive and record the intensity of secondary fields at various frequencies and locations. By calculating the ratio of electric field components to magnetic field components, it is possible to determine the apparent resistivity according to Cagniard, with resistivity measured in ohm-meters, thereby obtaining information regarding the subsurface electrical parameters.

Whether utilizing natural sources or artificial field sources as excitation fields, both require the use of electric field sensors, magnetic field sensors, and receivers to record the amplitude and phase information of secondary fields. Electric field sensors are used in contact with the ground surface to obtain the potential difference between two points, which is recorded by the receiver. The electric field intensity is then derived by dividing this potential difference by the distance between the two points. Magnetic field sensors convert magnetic field information into voltage signals, which are collected and recorded by the receiver. It is therefore evident that the type of signals observed in electromagnetic measurements must be adjusted according to the measurement method, and receivers must possess the capability to connect both electric field and magnetic field sensors and record both electric and magnetic field signals.

The existing multi-channel electromagnetic receivers are capable of collecting electric field or magnetic field signals; however, the type of measurement signal for input channels is relatively fixed, meaning that electric field channels can only measure electric field signals, and magnetic field channels can only measure magnetic field signals. Nevertheless, when conducting electromagnetic field observations, instruments need to accommodate different measurement methods. For instance, a single MT/AMT measurement point requires measuring 2 electric field and 3 magnetic field signals; during CSAMT measurements, all receiver channels may measure electric field signals, or one channel may measure magnetic field signals while the remaining channels measure electric field signals. Therefore, there is now a need to provide a device capable of accommodating both electric field and magnetic field sensors, enhancing the flexibility of electromagnetic measurements and improving the efficiency of field observations.

SUMMARY

In response to the deficiencies in existing technology, the purpose of the present disclosure is to provide a universal channel design method and device for electromagnetic instruments, aimed at resolving the issue wherein existing multi-channel electromagnetic receivers, when collecting electric or magnetic field signals, have fixed input channel measurement signal types, i.e., electric field channels can only measure electric field signals, and magnetic field channels can only measure magnetic field signals, which greatly reduces the flexibility of electromagnetic measurements and lowers the efficiency of field observations.

To achieve the above purpose, on one hand, the present disclosure provides a universal channel device for electromagnetic instruments, including: a plurality of measurement channels, a plurality of single electrode connectors, a multi-electrode connector, a plurality of magnetic field connectors and a plurality of double pole double throw switches.

Two middle ports of each of the double pole double throw switches are correspondingly connected to one of the measurement channels. Two ports on a first outer side of each of the double pole double throw switches are respectively connected to the positive input terminal and negative input terminal of two of the single electrode connectors or the magnetic field connectors. Two ports on a second outer side of each of the double pole double throw switches are connected to the multi-electrode connector. In electromagnetic method testing, each of the single electrode connectors is connected to an electric field sensor, and each of the magnetic field is connected to a magnetic field sensor.

A corresponding measurement channel of the measurement channels that corresponds to one of the magnetic field connectors is provided to measure magnetic field signals or is connected to the multi-electrode connector for measuring electric field signals through the double pole double throw switches.

A measurement channel of the measurement channels that corresponds to every two single electrode connectors is provided to measure electric field signals or is connected to a multi-electrode connector to measure electric field signals through the double pole double throw switches.

Further preferably, the universal channel device for electromagnetic instrument further includes an FPGA controller, which is connected to the magnetic field connectors and the single electrode connectors. The FPGA controller is provided to determine whether the magnetic field sensors are connected to the magnetic field connectors and identifying the channel number of the connected measurement channels, and provided to control the switching of each of the double pole double throw switches, as well as controlling the FPGA controller to read the electric field signal and/or the magnetic field signal.

Further preferably, four single electrode connectors, three magnetic field connectors, five double pole double throw switches, and five measurement channels are provided.

The first single electrode connector is connected to the first port on a first side of the first double pole double throw switch, and the second single electrode connector is connected to the second port on the first side of the first double pole double throw switch. The two third ports of the first double pole double throw switch are connected to the first measurement channel. The two ports on a second side of the first double pole double throw switch is connected to the multi-electrode connector.

The third single electrode connector is connected to the first port on a first side of the second double pole double throw switch, and the fourth single electrode connector is connected to the second port on the first outer side of the second double pole double throw switch. The two third ports of the second double pole double throw switch are connected to the second measurement channel. The two ports on a second outer side of the second double pole double throw switch is connected to the multi-electrode connector.

The positive input terminal and negative input terminal of the first magnetic field connector are respectively connected to two ports on a first side of the third double pole double throw switch; the two ports on a second side of the third double pole double throw switch are connected to the multi-electrode connector; the third port of the third double pole double throw switch is connected to the third measurement channel.

The positive input terminal and negative input terminal of the second magnetic field connector are respectively connected to two ports on a first side of the fourth double pole double throw switch; the two ports on a second side of the fourth double pole double throw switch are connected to the multi-electrode connector; the third port of the fourth double pole double throw switch is connected to the fourth measurement channel.

The positive input terminal and negative input terminal of the third magnetic field connector are respectively connected to the two ports on a first side of the fifth double pole double throw switch; the two ports on a second outer side of the fifth double pole double throw switch are connected to the multi-electrode connector; the third port of the fifth double pole double throw switch is connected to the fifth measurement channel.

Further preferably, the FPGA controller includes: a common mode suppressor, a front-end amplifier, a programmable amplifier, a low pass filter, and an analog-to-digital converter connected in sequence.

The common mode suppressor is provided to suppress the common mode noise carried in the input signals of the electric field sensor and magnetic field sensor, so as to obtain differential signals and to transmit the differential signals to the front-end amplifier.

The front-end amplifier is provided to preliminarily amplify the original electric field signals and magnetic field signals.

The programmable amplifier is provided to further amplify the preliminarily amplified electric field signals and magnetic field signals.

The low pass filter is provided to filter out noise higher than the frequency of effective electric field signals and magnetic field signals, and serve the anti-aliasing function.

The analog-to-digital converter is provided to collect and convert electric field signals and magnetic field signals.

Further preferably, when the universal channel device for electromagnetic instrument is used for MT and AMT measurement, the first electric field sensor located in the east side is connected to the first single electrode connector; the second electric field sensor located in the west side is connected to the second single electrode connector; and the first electric field sensor located in the east side and the second electric field sensor located in the west side are connected to the positive input terminal and negative input terminal of the first measurement channel. The first measurement channel is provided to measure the electric field signal Ex in the east-west direction.

The third electric field sensor located in the north side is connected to the third single electrode connector; the fourth electric field sensor located in the south side is connected to the fourth single electrode connector; and the third electric field sensor in the north side and the fourth electric field sensor in the south side due south direction are connected to the positive input terminal and negative input terminal of the second measurement channel. The second measurement channel is provided to measure the electric field signal Ey in the north-south direction.

The first magnetic field sensor is connected to the first magnetic field connector, and the first magnetic field sensor is connected to the positive input terminal and negative input terminal of the third measurement channel. The third measurement channel is provided to measure the magnetic field signal Hx in the east-west direction.

The second magnetic field sensor is connected to the second magnetic field connector, and the second magnetic field sensor is connected to the positive input terminal and negative input terminal of the fourth measurement channel. The fourth measurement channel is provided to measure the magnetic field signal Hy in the north-south direction.

The third magnetic field sensor in a direction perpendicular to the ground is connected to the third magnetic field connector. The third magnetic field sensor is connected to the positive input terminal and negative input terminal of the fifth measurement channel. The fifth measurement channel is provided to measure the magnetic field signal Hz in the direction perpendicular to the ground.

Further preferably, when the universal channel device for electromagnetic instrument is used for CSAMT measurement and the receiver measures four electric fields and one magnetic field, five electric field sensors are connected to a multi-electrode connector, and the first electric field sensor is connected to the positive input terminal of the first measurement channel. The second electric field sensor is connected to the negative input terminal of the first measurement channel. The first measurement channel is provided to measure the first electric field signal.

The second electric field sensor is connected to the positive input terminal of the second measurement channel. The third electric field sensor is connected to the negative input terminal of the second measurement channel. The second measurement channel is provided to measure the second electric field signal.

The third electric field sensor is connected to the positive input terminal of the third measurement channel. The fourth electric field sensor is connected to the negative input terminal of the third measurement channel. The third measurement channel is provided to measure the third electric field signal.

The fourth electric field sensor is connected to the positive input terminal of the fourth measurement channel. The fifth electric field sensor is connected to the negative input terminal of the fourth measurement channel. The fourth measurement channel is provided to measure the fourth electric field signal.

The second magnetic field sensor is connected to the positive input terminal and negative input terminal of the fifth measurement channel. The fifth measurement channel is provided to measure the second magnetic field sensor.

Further preferably, when the universal channel device for electromagnetic instrument is used for CSAMT measurement and the receiver measures five electric fields, six electric field sensors are connected to the multi-electrode connector, the first electric field sensor is connected to the positive input terminal of the first measurement channel, and the second electric field sensor is connected to the negative input terminal of the first measurement channel. The first measurement channel is provided to measure the first electric field signal.

The second electric field sensor is connected to the positive input terminal of the second measurement channel, and the third electric field sensor is connected to the negative input terminal of the second measurement channel. The second measurement channel is provided to measure the second electric field signal.

The third electric field sensor is connected to the positive input terminal of the third measurement channel, and the fourth electric field sensor is connected to the negative input terminal of the third measurement channel. The third measurement channel is provided to measure the third electric field signal.

The fourth electric field sensor is connected to the positive input terminal of the fourth measurement channel, and the fifth electric field sensor is connected to the negative input terminal of the fourth measurement channel. The fourth measurement channel is provided to measure the fourth electric field signal.

The fifth electric field sensor is connected to the positive input terminal of the fifth measurement channel, and the sixth electric field sensor is connected to the negative input terminal of the fifth measurement channel. The fifth measurement channel is provided to measure the fifth electric field signal.

On the other hand, based on the above-provided universal channel device for electromagnetic instrument, the present disclosure provides a corresponding universal channel control method for electromagnetic instrument. The method is specifically described as follows.

Based on the number of electric fields and the number of magnetic fields that need to be measured by different electromagnetic methods, the electric field sensors are connected to the single electrode connectors or the multi-electrode connector, and/or the magnetic field sensors are connected to the magnetic field connectors.

The double pole double throw switch is controlled so that the electric field sensors and/or magnetic field sensors may be connected to the measurement to acquire the electric field signals and magnetic field signals.

Further preferably, when all single electrode connectors are adopted to connect the electric field sensors to the measurement channels, and it is still not possible to acquire the number of electric fields required to be measured by the electromagnetic method, then multi-electrode connectors are adopted to connect the electric field sensors to the measurement channels in order to acquire the number of electric fields required to be measured by the electromagnetic method.

Overall, compared with the existing technology, the technical solutions conceived in the present disclosure have the following advantageous effects.

The present disclosure provides a universal channel device for electromagnetic instruments, including a plurality of single electrode connectors, a multi-electrode connector, and a plurality of magnetic field connectors, which may be connected to electric field sensors and/or magnetic field sensors. When different electromagnetic measurements require a number of electric fields that may be measured using single electrode connectors input to the measurement channels, the single electrode connectors are adopted to connect to the electric field sensors. When different electromagnetic method measurements require a number of electric fields that may not be measured using single electrode connectors input to the measurement channels, the multi-electrode connector is adopted to input the electric field sensors into a larger number of measurement channels. In the meantime, the magnetic field connectors may also be used to connect magnetic field sensors to corresponding measurement channels to acquire magnetic field signals. Therefore, for different electromagnetic method measurements, the input measurement channels of the present disclosure have universality, which may improve the flexibility of electromagnetic observation. Not only that it is possible to perform measurements of two magnetic fields and three electric fields, but also it is possible to perform measurements of four electric fields and one magnetic field or five electric fields. The universal channel device for electromagnetic instruments provided by the present disclosure may be applied to MT, AMT, and CSAMT observations. Meanwhile, electric field sensors and magnetic field sensors may be set up at different positions in the detection area to implement single-point electric field measurements or profile electric field measurements, as well as magnetic field measurements in different directions. It is possible to implement both single-point, profile measurements, and array observations, such as for metal ore exploration, groundwater detection, etc.

BRIEF DESCRIPTION OF THE DRAWINGS

In all drawings, the same reference numerals are used to represent the same elements or
structures.

DESCRIPTION OF THE EMBODIMENTS

In order to make the purpose, technical solutions, and advantages of the present disclosure more comprehensible, the following will provide further detailed explanation of the present disclosure in conjunction with the drawings and embodiments. It should be understood that the specific embodiments described here are only used to explain the present disclosure, and are not intended to limit the present disclosure.

In this specification and claims, terms such as "first" and "second" are used to distinguish different objects, rather than to describe a specific order of the objects.

In the embodiments of the present disclosure, words such as "exemplary" or "for example" are used to present examples, illustrations or explanations. Any embodiment or design scheme described as "exemplary" or "for example" in the embodiments of the present disclosure should not be interpreted as more preferable or advantageous than other embodiments or design schemes. More precisely, the use of words such as "exemplary" or "for example" is intended to present relevant concepts in a specific manner.

In the description of the embodiments of the present disclosure, unless otherwise stated, "multiple" means two or more.

Figure 1:
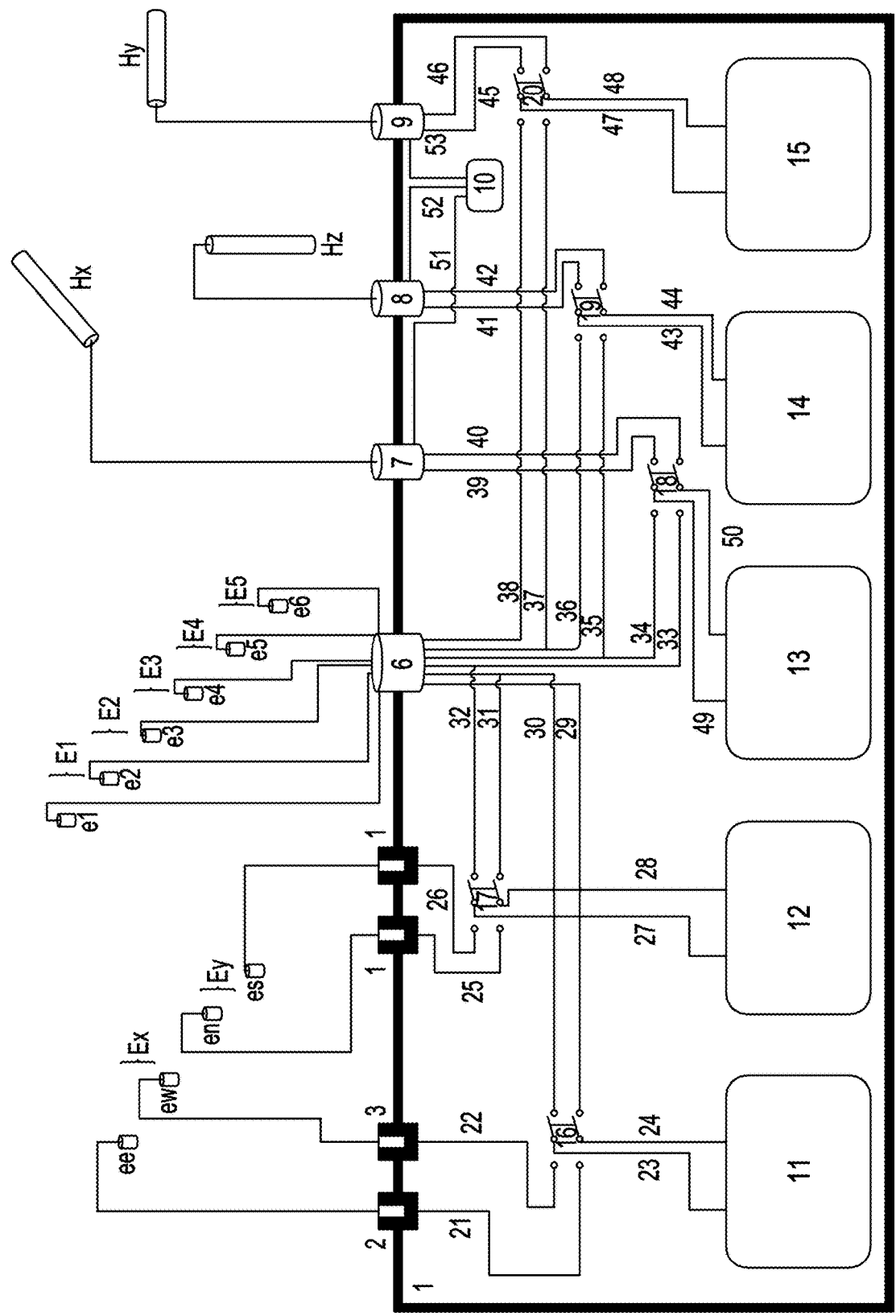
FIG. 1 is a schematic diagram of a universal channel device for electromagnetic instrument provided by an embodiment of the present disclosure.

As shown in FIG. 1, the present disclosure provides a universal channel device for electromagnetic instruments, which is specifically described as follows. A housing 1 is provided to load the entire device. A first single electrode connector 2 is connected to the first end (i.e., as shown in FIG. 1, the lower left end of all ends) of the first double pole double throw switch 16 through the first signal connection line 21. A second single electrode connector 3 is connected to the first double pole double throw switch 16 through the second signal connection line 22. The positive input terminal of the first measurement channel 11 is connected to the second end (i.e., as shown in FIG. 1, the middle upper end of all ends) of the first double pole double throw switch 16 through the third signal connection line 23. The negative input terminal of the first measurement channel 11 is connected to the third end (i.e., as shown in FIG. 1, the middle lower end of all ends) of the first double pole double throw switch 16 through the fourth signal connection line 24. The fourth end (i.e., as shown in FIG. 1, the lower right end of all ends) of the first double pole double throw switch 16 is connected to the multi-electrode connector 6 through the ninth signal connection line 29. The fifth end (i.e., as shown in FIG. 1, the upper right end of all ends) of the first double pole double throw switch 16 is connected to the multi-electrode connector 6 through the tenth signal connection line 30. The third single electrode connector 4 is connected to the lower left end of the second double pole double throw switch 17 through the fifth signal connection line 25. The fourth single electrode connector 5 is connected to the sixth end (i.e., as shown in FIG. 1, the upper left end of all ends) of the second double pole double throw switch 17 through the sixth signal connection line 26. The positive input terminal of the second measurement channel is connected to the middle upper end of the second double pole double throw switch 17 through the seventh signal connection line 27. The negative input terminal of the second measurement channel is connected to the middle lower end of the second double pole double throw switch 17 through the eighth signal connection line 28. The lower right end of the second double pole double throw switch 17 is connected to the multi-electrode connector 6 through the eleventh signal connection line 31. The upper right end of the second double pole double throw switch 17 is connected to the multi-electrode connector 6 through the twelfth signal connection line 32. The multi-electrode connector 6 is connected to the lower left end of the third double pole double throw switch 18 through the thirteenth signal connection line 33. The multi-electrode connector 6 is connected to the upper left end of the third double pole double throw switch 18 through the fourteenth signal connection line 34. The positive input terminal of the third measurement channel 13 is connected to the lower right end of the third double pole double throw switch 18 through the twenty-ninth signal connection line 49, and is connected to the first magnetic field connector 7 through the twentieth signal connection line 40. The upper right end of the third double pole double throw switch 18 is connected to the first magnetic field sensor connector 7 through the nineteenth signal connection line 39. The lower left end of the fourth double pole double throw switch 19 is connected to the multi-electrode connector 6 through the fifteenth signal connection line 35. The upper left end of the fourth double pole double throw switch 19 is connected to the multi-electrode connector 6 through the sixteenth signal connection line 36. The second magnetic field connector 8 is connected to the upper right end of the fourth double pole double throw switch 19 through the twenty-first signal connection line 41. The second magnetic field connector 8 is connected to the lower right end of the fourth double pole double throw switch 19 through the twenty-second signal connection line 42. The positive input terminal of the fourth measurement channel 14 is connected to the middle upper end of the fourth double pole double throw switch 19 through the twenty-third signal connection line 43. The negative input terminal of the fourth measurement channel 14 is connected to the middle lower end of the fourth double pole double throw switch 19 through the twenty-fourth signal connection line 44. The lower left end of the fifth double pole double throw switch 20 is connected to the multi-electrode connector 6 through the seventeenth signal connection line 37. The upper left end of the fifth double pole double throw switch 20 is connected to the multi-electrode connector 6 through the eighteenth signal connection line 38. The third magnetic field connector 9 is connected to the upper right end of the fifth double pole double throw switch 20 through the twenty-fifth signal connection line 45. The third magnetic field connector 9 is connected to the lower right end of the fifth double pole double throw switch 20 through the twenty-sixth signal connection line 46. The positive input terminal of the fifth measurement channel 15 is connected to the middle upper end of the fifth double pole double throw switch 20 through the twenty-seventh signal connection line 47. The negative input terminal of the fifth measurement channel 15 is connected to the middle lower end of the fifth double pole double throw switch 20 through the twenty-eighth signal connection line 48. The first magnetic field connector 7 is connected to the FPGA controller 10 through the first detection line 51. The second magnetic field connector 8 is connected to the FPGA controller 10 through the second detection line 52. The third magnetic field connector 9 is connected to the FPGA controller 10 through the third detection line 53.

Figure 2:
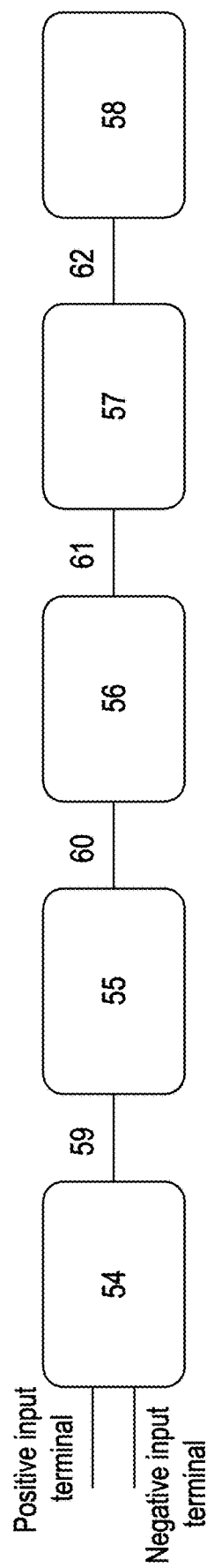
FIG. 2 is a schematic diagram showing the principle of a measurement channel provided by an embodiment of the present disclosure.

As shown in FIG. 1 and FIG. 2, the first measurement channel 11, the second measurement channel 12, the third measurement channel 13, the fourth measurement channel 14 and the fifth measurement channel 15 are completely identical. The output terminal of the common mode suppressor 54 is connected to the input terminal of the front-end amplifier 55 through the thirty-first signal connection line 59. The output terminal of the common mode suppressor 54 is connected to the input terminal of the programmable amplifier 56 through the thirty-second signal connection line 60. The output terminal of the programmable amplifier 56 is connected to the input terminal of the low pass filter 57 through the thirty-third signal connection line 61. The output terminal of the low pass filter 57 is connected to the input terminal of the analog-to-digital converter 58 through the thirty-fourth signal connection line 62.

Before introducing the design method of universal channel for electromagnetic instruments, the following introduces several concepts involved in electromagnetic methods.

Natural fields mainly originate from solar wind or lightning, and so on, while artificial sources are mainly generated by arranging two electrodes on the ground surface at a distance of 1 to 3 kilometers. Moreover, wires are utilized to connect the two transmitter electrodes to a transmitter, which inputs current of a specific frequency into the electrodes. During the propagation of electromagnetic waves in conductors, the energy of the electromagnetic field continuously attenuates along the propagation path. Electromagnetic waves with low frequency attenuate slowly and may be used to detect deeper underground information. Energy of electromagnetic waves with high frequency attenuate quickly and can only be used for measuring resistivity at a shallow surface. In electromagnetic method measurements, dozens of different frequencies of electromagnetic waves between 0.01 Hz to 10 kHz are generally adopted to acquire resistivity information at different depths.

When using natural source magnetotelluric (MT) and audio-magnetotelluric (AMT) measurements, a single measurement point needs to measure two electric field signals (Ex, Ey) and three magnetic field signals (Hx, Hy, Hz). When using artificial source controlled source audio-magnetotelluric (CSAMT) to avoid repeated transmission, to accelerate measurement efficiency and to acquire two-dimensional and three-dimensional resistivity information, it is required to perform synchronous collection at multiple measurement points and simultaneously measure dozens of electric field signals and multiple magnetic field signals, where electric field signals at relatively close distances may share one magnetic field signal.

The universal channel device for electromagnetic instrument provided by the present disclosure may be connected to electric field sensors, and may also be connected to magnetic field sensors. Regarding measurement situations of different electric field sensors and magnetic field sensors, the present disclosure provides a design method for universal channels for electromagnetic instruments, specifically including the following steps.

When performing MT (Magnetotelluric) and AMT (Audio Magnetotelluric) measurements, the electric field sensor ee located in the due east direction is connected to the first single electrode connector 2. The electric field sensor ew located in the due west direction is connected to the second single electrode connector 3. The electric field sensor en located in the due north direction is connected to the third single electrode connector 4. The electric field sensor es located in the due south direction is connected to the fourth single electrode connector 5. The magnetic field sensor Hx in the east-west direction is connected to the first magnetic field connector 7. The magnetic field sensor Hy in the north-south direction is connected to the second magnetic field connector 8. The magnetic field sensor Hz perpendicular to the ground is connected to the third magnetic field connector 9. Under the circumstances, the first double pole double throw switch 16 is switched to the left end. The electric field sensor ee and electric field sensor ew are connected to the positive input terminal and negative input terminal of the first measurement channel 11 respectively. The second double pole double throw switch 17 is switched to the left end. The electric field sensor en and electric field sensor es are connected to the positive input terminal and negative input terminal of the second measurement channel 12 respectively. The third double pole double throw switch 18 is switched to the right end. The magnetic field sensor is connected to the positive input terminal and negative input terminal of the third measurement channel 13. The fourth double pole double throw switch 19 is switched to the right end. The magnetic field sensor is connected to the positive input terminal and negative input terminal of the fourth measurement channel 14. The fifth double pole double throw switch 20 is switched to the right end. The magnetic field sensor is connected to the positive input terminal and negative input terminal of the fifth measurement channel 15. Under the circumstances, the first measurement channel 11 measures the electric field signal Ex. The second measurement channel 12 measures the electric field signal Ey. The third measurement channel 13 measures the magnetic field signal Hx. The fourth measurement channel 14 measures the magnetic field signal Hy. The fifth measurement channel 15 measures the magnetic field signal Hz. In this way, the measurement of 2 electric fields and 3 magnetic fields may be realized.

When performing CSAMT (Controlled Source Audio Magnetotelluric) measurement and the receiver measures 4 electric fields and 1 magnetic field, 5 electric field sensors e1, e2, e3, e4 and e5 are connected to the multi-electrode connector 6. The first double pole double throw switch 16 is switched to the right. The electric field sensor e1 is connected to the positive input terminal of the first measurement channel 11. The electric field sensor e2 is connected to the negative input terminal of the first measurement channel 11. The second double pole double throw switch 17 is switched to the right. The electric field sensor e2 is connected to the positive input terminal of the second measurement channel 12. The electric field sensor e3 is connected to the negative input terminal of the second measurement channel 12. The third double pole double throw switch 18 is switched to the left. The electric field sensor e3 is connected to the positive input terminal of the third measurement channel 13. The electric field sensor e4 is connected to the negative input terminal of the third measurement channel 13. The fourth double pole double throw switch 19 is switched to the left. The electric field sensor e4 is connected to the positive input terminal of the fourth measurement channel 14. The electric field sensor e5 is connected to the negative input terminal of the fourth measurement channel 14. The fifth double pole double throw switch 20 is switched to the right. The magnetic field sensor Hy is connected to the positive input terminal and negative input terminal of the fifth measurement channel 15. Under the circumstances, the first measurement channel 11 measures electric field signal e1. The second measurement channel 12 measures electric field signal e2. The third measurement channel 13 measures electric field signal e3. The fourth measurement channel 14 measures electric field signal e4. The fifth measurement channel 15 measures magnetic field signal Hy. In this way, the measurement of 4 electric fields and 1 magnetic field may be realized.

When performing CSAMT measurement and the receiver measures 5 electric fields, 6 electric field sensors e1, e2, e3, e4, e5 and e6 are connected to the multi-electrode connector 6. The first double pole double throw switch 16 is switched to the right. The electric field sensor e1 is connected to the positive input terminal of the first measurement channel 11. The electric field sensor e2 is connected to the negative input terminal of the first measurement channel 11. The second double pole double throw switch 17 is switched to the right. The electric field sensor e2 is connected to the positive input terminal of the second measurement channel 12. The electric field sensor e3 is connected to the negative input terminal of the second measurement channel 12. The third double pole double throw switch 18 is switched to the left. The electric field sensor e3 is connected to the positive input terminal of the third measurement channel 13. The electric field sensor e4 is connected to the negative input terminal of the third measurement channel 13. The fourth double pole double throw switch 19 is switched to the left. The electric field sensor e4 is connected to the positive input terminal of the fourth measurement channel 14. The electric field sensor e5 is connected to the negative input terminal of the fourth measurement channel 14. The fifth double pole double throw switch 20 is switched to the left. The electric field sensor e5 is connected to the positive input terminal of the fifth measurement channel 15. The electric field sensor e6 is connected to the negative input terminal of the fifth measurement channel 15. Under the circumstances, the first measurement channel 11 measures electric field signal e1. The second measurement channel 12 measures electric field signal e2. The third measurement channel 13 measures electric field signal e3. The fourth measurement channel 14 measures electric field signal e4. The fifth measurement channel 15 measures electric field signal e5. In this way, the measurement of 5 electric fields may be realized.

FIG. 2 is a schematic diagram showing the principle of the measurement channel. After the positive input terminal and negative input terminal are connected to the measurement channel, they first pass through the common mode suppressor 54, which suppresses the common mode noise introduced by the ground and connection lines to obtain the differential useful signal. Meanwhile, a voltage clamping circuit may be set in the common mode suppressor 54 to protect the measurement channel when the input signal amplitude exceeds the channel measurement range, thereby improving the signal-to-noise ratio of the measurement channel. The function of the front-end amplifier 55 is to preliminarily amplify the weak input electric field and magnetic field signals. The programmable amplifier 56 then performs further amplification. The amplification factor of the programmable amplifier 56 may be controlled through programming, which may improve the universality of the measurement channel for measuring electric field signals and magnetic field signals. Generally, electric field signals are weaker than magnetic field signals. When the measurement channel measures electric field signals, the gain of the programmable amplifier 56 is set to 100, and when the channel measures magnetic field signals, the gain of the programmable amplifier 56 is set to 10. The low pass filter 57 functions to filter out noise higher than the effective signal frequency and serves anti-aliasing function. After amplification by the front-end amplifier 55 and programmable amplifier 56, the filtering by the low pass filter 57 may improve the signal-to-noise ratio before data collection. The analog-to-digital converter 58 finally implements signal collection and conversion.

Figure 3:
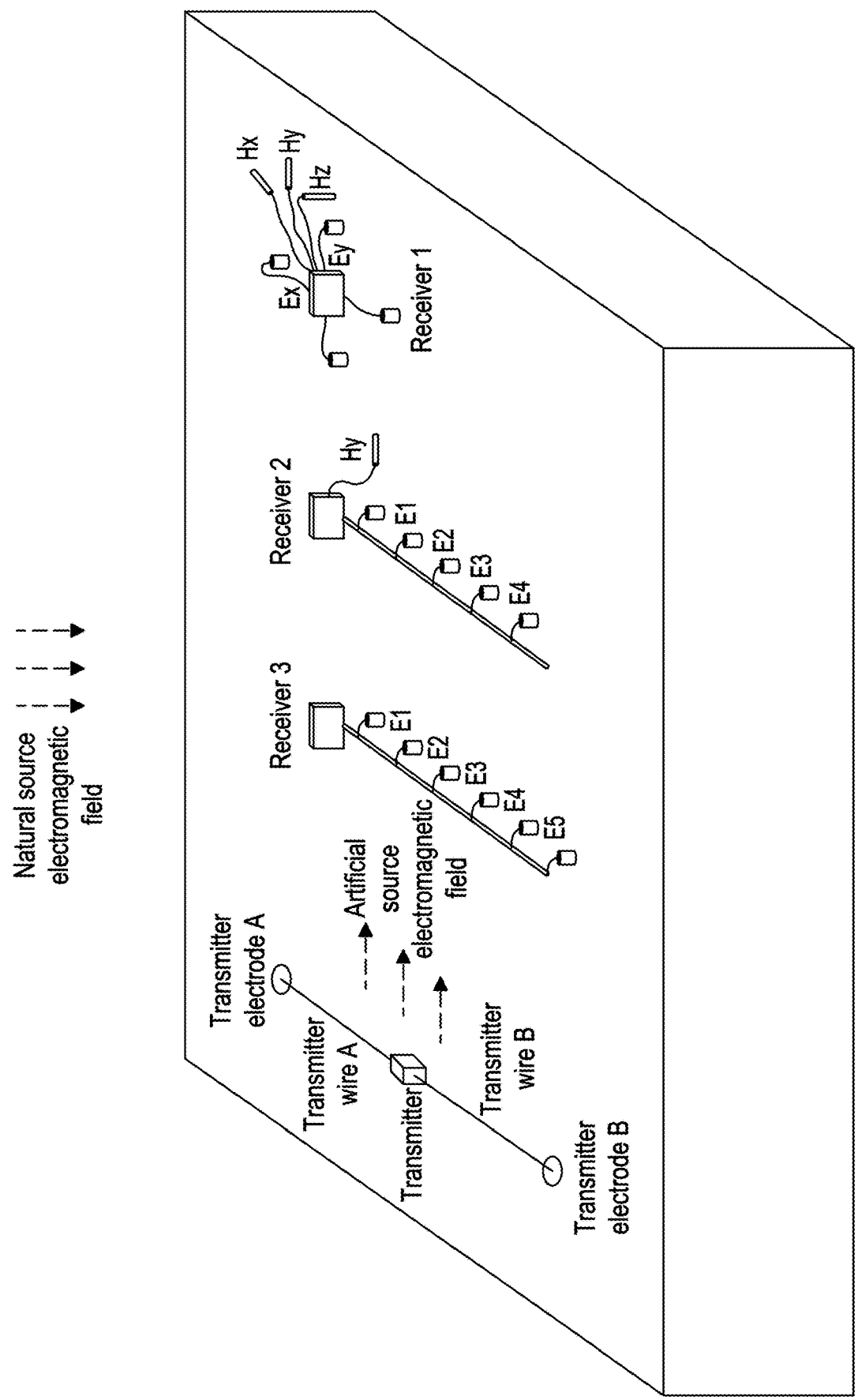
FIG. 3 is a schematic diagram of array electromagnetic field detection provided by an embodiment of the present disclosure.

FIG. 3 is a schematic diagram of array electromagnetic field detection. This device may observe the electromagnetic field generated by artificial sources (transmitter, transmitter wire A, transmitter electrode A, transmitter wire and transmitter electrode B), and may also observe the natural source electromagnetic field generated by solar wind or lightning. FIG. 3 shows three measurement modes, namely the first receiver performing MT/AMT measurement of 2 electric fields and 3 magnetic fields, the second receiver performing CSAMT measurement of 4 electric fields and 1 magnetic field, and the third receiver performing CSAMT measurement of 5 electric fields.

In summary, the present disclosure provides a method and device for universal channel design of electromagnetic instruments, which may input electric field sensors or magnetic field sensors. For different electromagnetic measurements, the input channels of this instrument have universality, which may improve the flexibility of electromagnetic observation. Not only that it is possible to perform measurements of 2 magnetic fields and 3 electric fields, but also to perform measurements of 4 electric fields and 1 magnetic field or 5 electric fields. The present disclosure may be applied to MT, AMT and CSAMT observations, and may implement single-point, profile measurements, as well as array observations, such as metal mineral exploration, groundwater detection, etc.

It may be understood that various numerical designations involved in the embodiments of the present disclosure are only for distinguishing purposes for convenience of description, and are not used to limit the scope of the embodiments of the present disclosure.

Those skilled in the art may easily understand that the above description is merely a preferred embodiment of the present disclosure and is not intended to limit the present disclosure. Any modifications, equivalent replacements, and improvements made within the spirit and principles of the present disclosure should be included within the scope to be protected by the present disclosure.

What is claimed is:

1. A universal channel device for electromagnetic instruments, comprising: a plurality of measurement channels, a plurality of single electrode connectors, a multi-electrode connector, a plurality of magnetic field connectors and a plurality of double pole double throw switches;

wherein two third ports of each of the plurality of double pole double throw switches are correspondingly connected to one of the plurality of measurement channels, two ports on a first side of each of the plurality of double pole double throw switches are respectively connected to a positive input terminal and a negative input terminal of two of the plurality of single electrode connectors or the plurality of magnetic field connectors, two ports on a second side of each of the plurality of double pole double throw switches are connected to the multi-electrode connector;

in electromagnetic method testing, each of the plurality of single electrode connectors is connected to an electric field sensor, and each of the plurality of magnetic field connectors is connected to a magnetic field sensor;

a corresponding measurement channel of the plurality of measurement channels that corresponds to every two of the plurality of single electrode connectors is provided to measure electric field signals or the corresponding measurement channel is connected through the plurality of double pole double throw switches to the multi-electrode connector for measuring the electric field signals;

the corresponding measurement channel is further provided to measure magnetic field signals or the corresponding measurement channel is connected through the plurality of double pole double throw switches to the multi-electrode connector for measuring the electric field signals;

wherein four of the plurality of single electrode connectors, three of the plurality of magnetic field connectors, five of the plurality of double pole double throw switches, and five of the plurality of measurement channels are provided;

a first single electrode connector is connected to a first port on a first side of a first double pole double throw switch, a second single electrode connector is connected to a second port on the first side of the first double pole double throw switch, two third ports of the first double pole double throw switch are connected to a first measurement channel, two ports on a second side of the first double pole double throw switch are connected to the multi-electrode connector;

a third single electrode connector is connected to a first port on a first side of a second double pole double throw switch, a fourth single electrode connector is connected to a second port on the first side of the second double pole double throw switch, two third ports of the second double pole double throw switch are connected to a second measurement channel, two ports on a second side of the second double pole double throw switch are connected to the multi-electrode connector;

a positive input terminal and a negative input terminal of a first magnetic field connector are respectively connected to two ports on a first side of a third double pole double throw switch, two ports on a second side of the third double pole double throw switch are connected to the multi-electrode connector; a third port of the third double pole double throw switch is connected to a third measurement channel;

a positive input terminal and a negative input terminal of a second magnetic field connector are respectively connected to two ports on a first side of a fourth double pole double throw switch, two ports on a second side of the fourth double pole double throw switch are connected to the multi-electrode connector, a third port of the fourth double pole double throw switch is connected to a fourth measurement channel;

a positive input terminal and a negative input terminal of a third magnetic field connector are respectively connected to two ports on a first side of a fifth double pole double throw switch, two ports on a second side of the fifth double pole double throw switch are connected to the multi-electrode connector, a third port of the fifth double pole double throw switch is connected to a fifth measurement channel.

2. The universal channel device for electromagnetic instruments according to claim 1, further comprising: a FPGA controller, which is connected to the plurality of magnetic field connectors and the plurality of single electrode connectors, wherein the FPGA controller is provided to determine whether the magnetic field sensors are connected to the plurality of magnetic field connectors and to identify a channel number of the plurality of measurement channels that are connected to the magnetic field sensors, and provided to control switching of each of the plurality of double pole double throw switches, and controlling the FPGA controller to read the electric field signals and/or the magnetic field signals.

3. The universal channel device for electromagnetic instruments according to claim 1, wherein when used for MT and AMT measurement, a first electric field sensor located in an east side is connected to a positive input terminal of the first measurement channel through the first single electrode connector, a second electric field sensor located in a west side is connected to a negative input terminal of the first measurement channel through the second single electrode connector, the first measurement channel is provided to measure the electric field signals in an east-west direction;

a third electric field sensor located in a north side is connected to a positive input terminal of the second measurement channel through the third single electrode connector, a fourth electric field sensor located in a south side is connected to a negative input terminal of the second measurement channel through the fourth single electrode connector, the second measurement channel is provided to measure the electric field signals in a north-south direction;

a first magnetic field sensor is connected to a positive input terminal and a negative input terminal of the third measurement channel through the first magnetic field connector, the third measurement channel is provided to measure the magnetic field signals in the east-west direction;

a second magnetic field sensor is connected to a positive input terminal and a negative input terminal of the fourth measurement channel through the second magnetic field connector, the fourth measurement channel is provided to measure the magnetic field signals in the north-south direction;

a third magnetic field sensor in a direction perpendicular to a ground is connected to a positive input terminal and a negative input terminal of the fifth measurement channel through the third magnetic field connector, the fifth measurement channel is provided to measure the magnetic field signals in the direction perpendicular to the ground.

4. The universal channel device for electromagnetic instruments according to claim 1, wherein when used for controlled source audio-magnetotelluric (CSAMT) measurement and a receiver measures four electric fields and one magnetic field, five of the electric field sensors are connected to the multi-electrode connector, a first electric field sensor is connected to a positive input terminal of the first measurement channel, a second electric field sensor is connected to a negative input terminal of the first measurement channel, the first measurement channel is provided to measure a first electric field signal;

the second electric field sensor is connected to a positive input terminal of the second measurement channel, a third electric field sensor is connected to a negative input terminal of the second measurement channel, the second measurement channel is used for measuring a second electric field signal;

the third electric field sensor is connected to a positive input terminal of the third measurement channel, a fourth electric field sensor is connected to a negative input terminal of the third measurement channel, the third measurement channel is provided to measure a third electric field signal;

the fourth electric field sensor is connected to a positive input terminal of the fourth measurement channel, a fifth electric field sensor is connected to a negative input terminal of the fourth measurement channel, the fourth measurement channel is provided to measure a fourth electric field signal;

a second magnetic field sensor is connected to a positive input terminal and a negative input terminal of the fifth measurement channel, the fifth measurement channel is provided to measure the second magnetic field sensor for measuring the magnetic field signals in the north-south direction.

5. The universal channel device for electromagnetic instruments according to claim 1, wherein when used for CSAMT measurement and a receiver measures five electric fields, six of the electric field sensors are connected to the multi-electrode connector, a first electric field sensor is connected to a positive input terminal of the first measurement channel, a second electric field sensor is connected to a negative input terminal of the first measurement channel, the first measurement channel is provided to measure a first electric field signal;

the second electric field sensor is connected to a positive input terminal of the second measurement channel, a third electric field sensor is connected to a negative input terminal of the second measurement channel, the second measurement channel is provided to measure a second electric field signal;

the third electric field sensor is connected to a positive input terminal of the third measurement channel, a fourth electric field sensor is connected to a negative input terminal of the third measurement channel, the third measurement channel is provided to measure a third electric field signal;

the fourth electric field sensor is connected to a positive input terminal of the fourth measurement channel, a fifth electric field sensor is connected to a negative input terminal of the fourth measurement channel, the fourth measurement channel is provided to measure a fourth electric field signal;

the fifth electric field sensor is connected to a positive input terminal of the fifth measurement channel, a sixth electric field sensor is connected to a negative input terminal of the fifth measurement channel, the fifth measurement channel is provided to measure a fifth electric field signal.

6. A universal channel control method for electromagnetic instruments for the universal channel device for electromagnetic instruments according to claim 1, comprising:

based on a number of electric fields and a number of magnetic fields that need to be measured by different electromagnetic methods, connecting the electric field sensors to the plurality of single electrode connectors or the multi-electrode connector, and/or connecting the plurality of magnetic field sensors to the plurality of magnetic field connectors; and controlling the plurality of double pole double throw switches so that the electric field sensors and/or the plurality of magnetic field sensors are connected to the plurality of measurement channels to acquire the electric field signals and the magnetic field signals.

7. The universal channel control method for electromagnetic instruments according to claim 6, wherein when all of the plurality of single electrode connectors are adopted to connect the electric field sensors to the measurement channels, and it is still not possible to acquire a number of electric fields required to be measured by an electromagnetic method, then the multi-electrode connector is adopted to connect the electric field sensors to the measurement channels in order to acquire the number of the electric fields required to be measured by the electromagnetic method.

* * * * *